US006785083B2

(12) United States Patent
Sloan et al.

(10) Patent No.: US 6,785,083 B2
(45) Date of Patent: Aug. 31, 2004

(54) APPLICATION OF REDUCED BIAS LEVELS TO DISC DRIVE READ ELEMENTS DURING PERIODS OF INACTIVITY

(75) Inventors: Brett A. Sloan, Edmond, OK (US); Christopher R. Fulkerson, Mustang, OK (US); Ronald L. Delamarter, Oklahoma City, OK (US); Paul F. Kusbel, Edmond, OK (US); Karl L. Enarson, Yukon, OK (US); Philip E. Cloud, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 266 days.

(21) Appl. No.: 10/024,863

(22) Filed: Dec. 18, 2001

(65) Prior Publication Data

US 2002/0154439 A1 Oct. 24, 2002

Related U.S. Application Data

(60) Provisional application No. 60/285,777, filed on Apr. 23, 2001.

(51) Int. Cl.$^7$ .............................................. G11B 5/596
(52) U.S. Cl. ................................................. 360/77.02
(58) Field of Search ............................. 360/75, 31, 69, 360/77.02, 77.17

(56) References Cited

U.S. PATENT DOCUMENTS

| | | | |
|---|---|---|---|
| 4,661,873 A | | 4/1987 | Schulze |
| 5,347,412 A | | 9/1994 | Nitta et al. |
| 5,384,675 A | | 1/1995 | Crawforth et al. |
| 5,452,277 A | * | 9/1995 | Bajorek et al. ........... 369/53.18 |
| 5,485,335 A | | 1/1996 | West |
| 5,521,896 A | * | 5/1996 | Bajorek et al. ........... 369/53.18 |
| 5,544,138 A | * | 8/1996 | Bajorek et al. ........... 369/53.42 |
| 5,572,379 A | | 11/1996 | Aoi et al. |
| 5,748,415 A | | 5/1998 | Christner et al. |
| 5,859,738 A | | 1/1999 | Forehand et al. |
| 5,877,911 A | | 3/1999 | Klaassen et al. |
| 5,983,357 A | * | 11/1999 | Sun ............................. 713/324 |
| 6,018,432 A | * | 1/2000 | Ukani .......................... 360/69 |
| 6,052,804 A | | 4/2000 | Thowe et al. |
| 6,122,131 A | * | 9/2000 | Jeppson .................... 360/77.02 |
| 6,193,422 B1 | * | 2/2001 | Belt et al. ................... 713/320 |
| 6,252,731 B1 | | 6/2001 | Sloan et al. |
| 6,445,527 B1 | * | 9/2002 | Cheng ......................... 360/69 |
| 6,528,974 B1 | * | 3/2003 | Mirov et al. ............... 323/267 |
| 6,608,476 B1 | * | 8/2003 | Mirov et al. ............ 324/103 R |

* cited by examiner

*Primary Examiner*—David Hudspeth
*Assistant Examiner*—Fred F. Tzeng
(74) *Attorney, Agent, or Firm*—Fellers, Snider, et al.

(57) ABSTRACT

Apparatus and method for enhancing disc drive reliability by applying reduced read bias levels to read elements of a disc drive during an idle mode of operation. A preamplifier driver circuit applies an operational read bias signal of selected, nonzero magnitude to the read element to transduce data from a recording surface during an active mode. Once a predetermined period of inactivity occurs during which host data transfer commands are not processed, the disc drive enters the idle mode and the preamplifier reduces the read bias signal magnitude. The reduced bias level during the idle mode reduces thermal stress and electromigration within the read element while still allowing data to be transduced from the recording surface as the drive performs a dithering operation to move the head to different tracks on the recording surface.

18 Claims, 4 Drawing Sheets

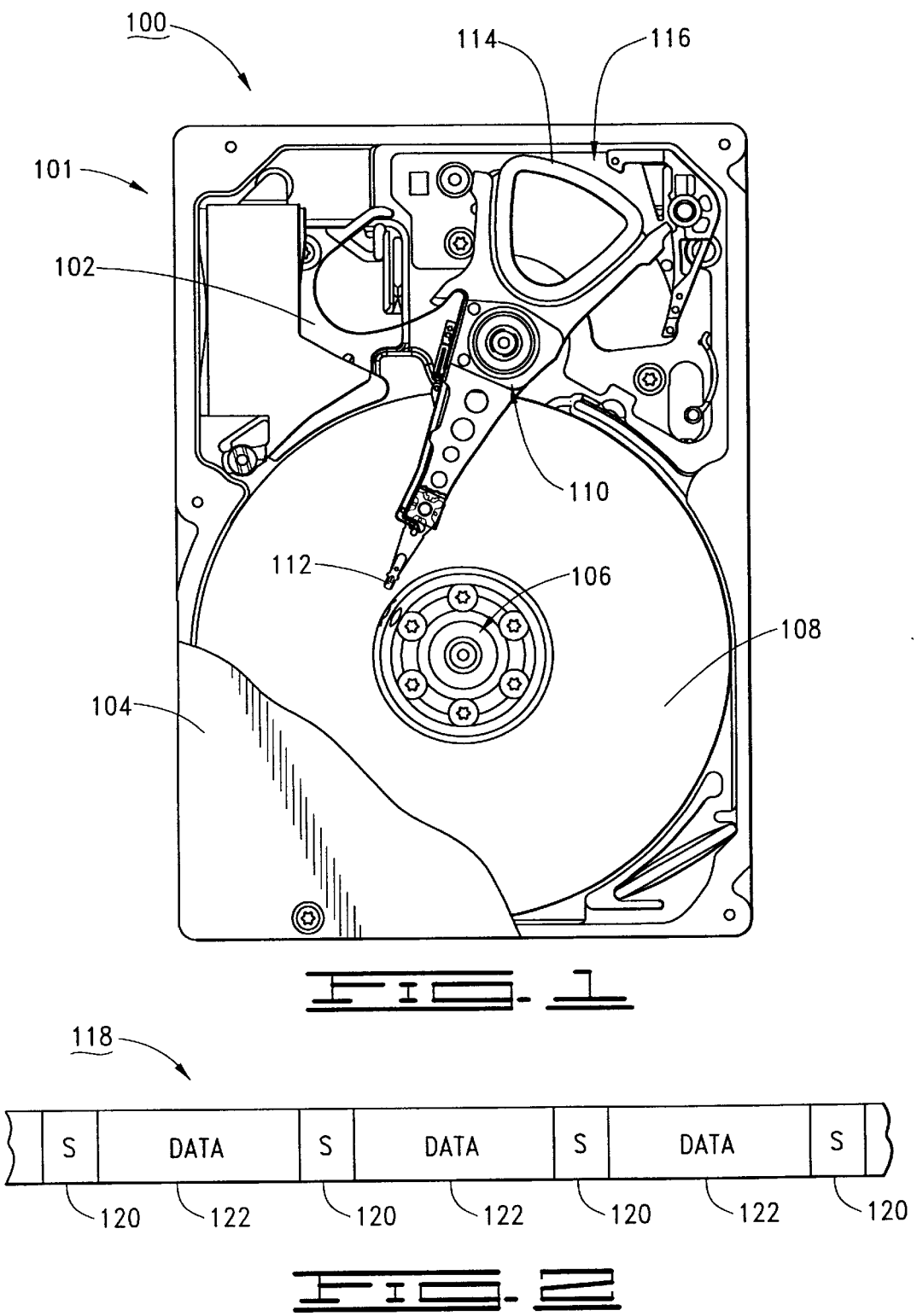

APPLICATION OF REDUCED BIAS LEVELS TO DISC DRIVE READ ELEMENTS DURING PERIODS OF INACTIVITY

RELATED APPLICATIONS

This application claims priority to U.S. Provisional Application No. 60/285,777 filed Apr. 23, 2001.

FIELD OF THE INVENTION

This invention relates generally to the field of disc drive data handling systems, and more particularly, but not by way of limitation, to a method and apparatus for reducing read element power dissipation during a disc drive idle condition to improve operational life of the read element.

BACKGROUND

Disc drives are data handling systems used to magnetically store and retrieve digital data files. A typical disc drive comprises one or more rigid recording storage discs arranged about a spindle motor for rotation at a constant high speed. A corresponding array of read/write heads are provided to transfer data between tracks defined on the disc surfaces and a host device (such as a computer) in which the disc drive is mounted. The heads are mounted to a rotary actuator and are controllably positioned adjacent the tracks through the application of current to an actuator motor (such as a voice coil motor, VCM).

Present generation disc drives typically employ heads which utilize separate read and write elements. The write element typically has a thin-film inductive coil construction with a write gap placed in close proximity to the recording medium. Input data to be written to a disc are encoded and serialized to generate a series of bi-directional write currents which are applied to the write element. Each change in the polarity of the write current results in a magnetic flux reversal, or flux transition, in the recording medium. Data are recorded along each track at a selected frequency in relation to the presence of a flux transition (a logical 1) or the absence of a flux transition (a logical 0) at regular intervals along the track.

The read element is typically provided from a magnetoresistive (MR) material having a semiconductor construction with very thin internal boundary areas. The MR element is configured to exhibit changed electrical characteristics when subjected to a magnetic field of a selected orientation. During a read operation, the read element is biased using a relatively small bias level (current or voltage), and the selective magnetization of the disc is detected in relation to induced changes in voltage across (or current through) the read element caused by the magnetization pattern along the track.

A phenomenon referred to as electromigration has been increasingly observed in recent generations of MR read elements. Generally, electromigration occurs when atoms from dissimilar, adjacent metal layers migrate, or mingle across the intermediary boundary between the layers. Such migration leads to a detrimental change in the internal configuration and operation of the device. It has been observed that higher operational temperatures and higher bias levels tend to accelerate the electromigration process in an MR read element, leading to degraded performance and a shortened operational life.

With the continuing trend of providing disc drives with ever greater levels of data storage and data rate capabilities, it is contemplated that future generation heads will have ever increasing levels of reader sensitivity and will thus be even more prone to damage from the effects of electromigration. There is therefore a continued need for improvements in the art whereby the operational performance and life of a disc drive reader element can be maintained and extended, and it is to such improvements that the present invention is directed.

SUMMARY OF THE INVENTION

In accordance with preferred embodiments, a disc drive data handling system is provided with a head having a read element used to transduce data from a recording surface.

The disc drive is initially operated in an active mode of operation in which data are transferred between the recording surface and a host device in response to a number of host data transfer commands. An operational read bias signal of selected, nonzero magnitude is applied to the read element to transduce data from the recording surface during the active mode.

Once a predetermined, uninterrupted period of time elapses since the most recent host data transfer command, the disc drive switches to an idle mode of operation. The read bias signal is reduced to a second, nonzero magnitude less than the magnitude of the operational read bias signal and used to transduce data from the data recording surface during the idle mode.

Preferably, the disc drive performs a dithering operation during the idle mode so that the disc drive carries out a number of seeks to tracks on the recording surface, and wherein the data transduced by the reduced read bias signal comprises servo data indicative of position of the read element during said seeks.

The operational read bias signal magnitude is preferably selected using specified criteria, such as read error rate or channel quality measurements. The reduced read bias signal magnitude is preferably selected as a predetermined percentage of the operational read bias signal, or by reducing the read bias level while transducing servo data from the recording surface.

These and various other features and advantages, which characterize the claimed invention, will be apparent from a reading of the following detailed description and a review of the associated drawings.

BRIEF DESCRIPTION OF THE DRAWINGS

FIG. 1 is a top plan view of a disc drive data handling system (disc drive) constructed in accordance with preferred embodiments of the present invention.

FIG. 2 depicts the general format for a selected track on which both servo data and user data are stored in respective servo data fields and user data fields.

FIG. 6 is a flow chart for a DATA TRANSFER routine generally illustrative of steps carried out in accordance with preferred embodiments to reduce the bias level of a read element during a write operation.

DETAILED DESCRIPTION

Figure 3:
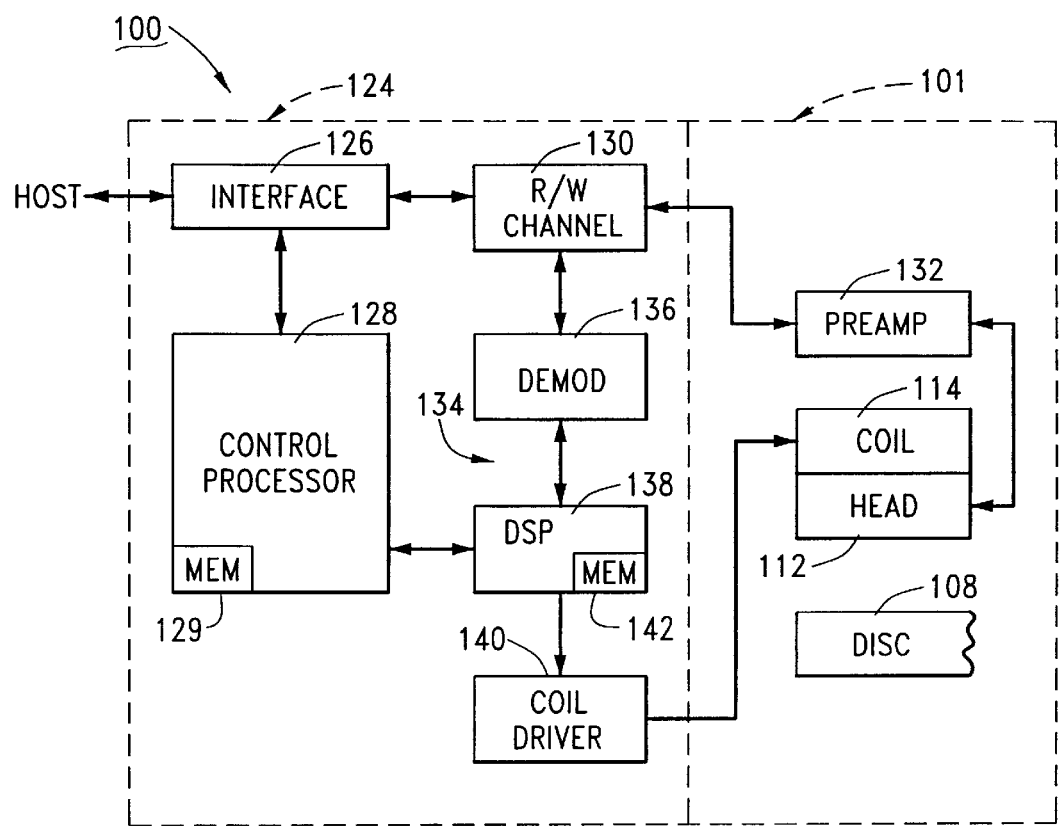
FIG. 3 is a functional block diagram of the disc drive of FIG. 1.

FIG. 1 provides a top plan view of a disc drive data handling system 100 constructed in accordance with preferred embodiments of the present invention. The disc drive is composed of two main assemblies: a head/disc assembly (HDA) 101 which encloses mechanical portions of the disc drive, and a disc drive printed circuit board (PCB) which supports electronic communications and control circuitry for the drive. The PCB is mounted to the underside of the HDA 101 and so is not visible in FIG. 1.

A base deck 102 and a top cover 104 (shown in partial cutaway) cooperate to form a sealed housing for the HDA 101. A spindle motor 106 rotates a number of magnetic recording discs 108 at a desired operational speed. An actuator assembly 110 supports an array of read/write heads 112 adjacent concentric tracks defined on the respective disc surfaces to transfer data between the discs and a host device. The heads 112 are controllably positioned through the application of current to an actuator coil 114 of a voice coil motor (VCM) 116.

FIG. 2 shows a portion of a track 118 from a selected disc surface. Servo data fields 120 store servo data used to control head position, and are written during disc drive manufacturing. Fixed size user data sectors are formed in data areas 122 between adjacent servo data fields 120 during a disc drive formatting operation and are used to store user data from the host device.

FIG. 3 provides a functional block diagram of the disc drive 100, including electronic circuits disposed on the aforementioned disc drive PCB (the PCB is numerically designated at 124 in FIG. 3). Data and host commands are provided from the host device to the disc drive 100 using interface (I/F) circuitry 126. A control processor 128 provides top level control of the disc drive 100 in conjunction with commands received by the host device and programming steps stored in control processor memory (MEM) 129. Data are transferred between the discs 108 and the host device using the I/F circuitry 126, a read/write (R/W) channel 130, and a preamplifier/driver (preamp) circuit 132. Sequencer circuitry (not separately shown) in the I/F circuitry 126 assert read gate (RG) and write gate (WG) signals to enable the reading and writing of data by the R/W channel 130 and preamplifier 132. For purposes herein, the I/F circuitry 126 and the R/W channel 130 are collectively referred to as a "communication channel."

Head positional control is provided by a closed-loop servo circuit 134 comprising demodulation (demod) circuitry 136, a servo processor 138 and coil driver circuitry 140. The servo processor preferably comprises a digital signal processor (DSP) which operates in conjunction with programming provided in DSP memory (MEM) 142 to receive servo position data from the servo data fields 120 (FIG. 2) and, in response thereto, output current command signals to the coil driver 140 to adjust the amount of current applied to the actuator coil 114. The servo circuit 134 is configured to carry out seek operations wherein a selected head is caused to move from an initial track to a destination track, and to carry out track following operations where the selected head is maintained over a selected track.

Figure 4:
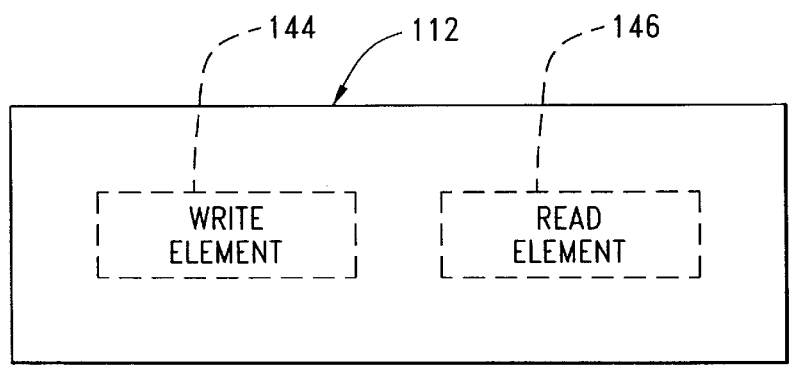
FIG. 4 schematically illustrates the conventional construction of each head as having separate read and write elements.
Figure 3:
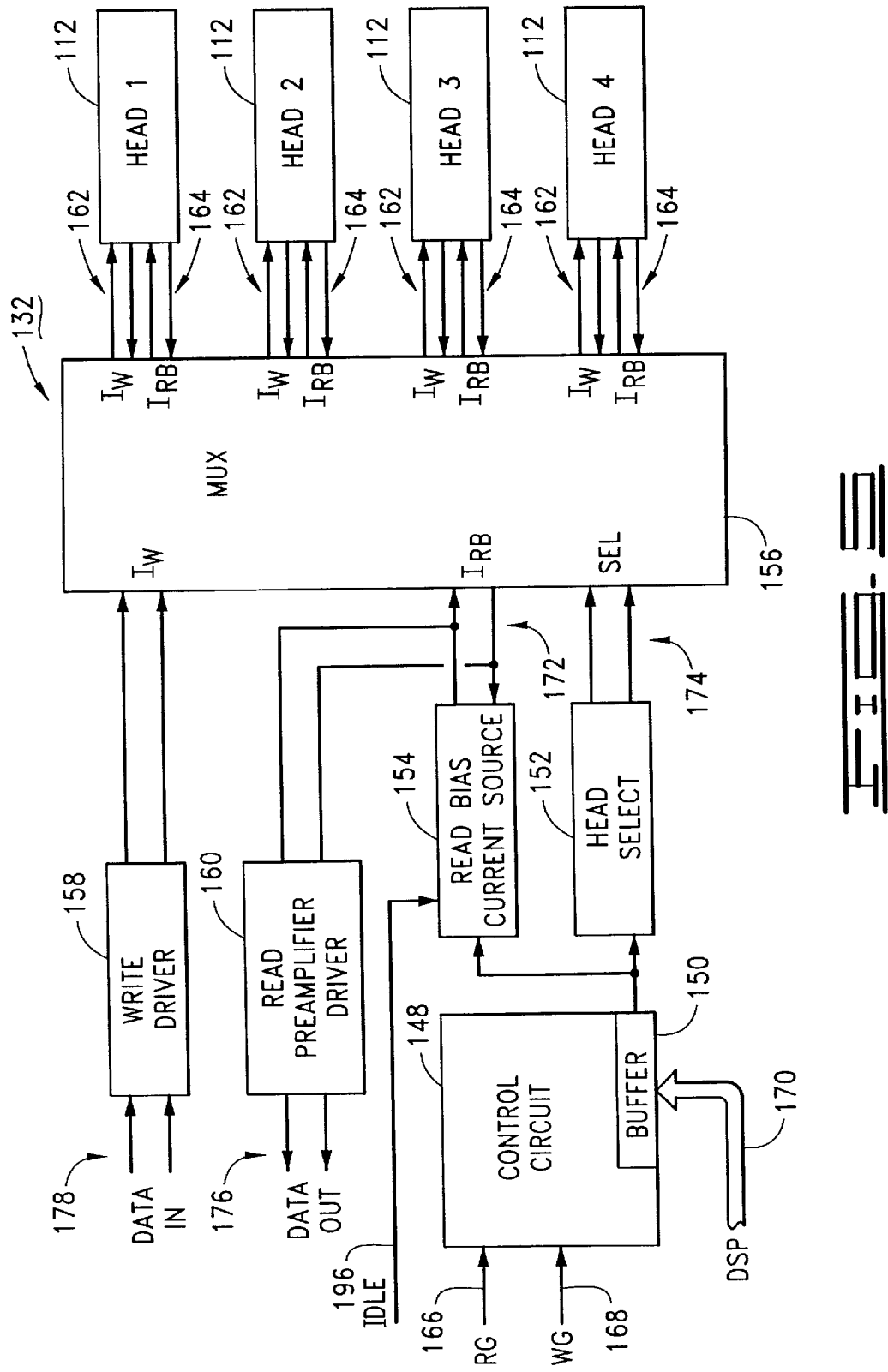

Each head 112 comprises separate write and read elements 144, 146, as represented in FIG. 4. The write element 144 preferably comprises a thin-film inductive coil with a write gap. Data are written by the application of bi-directional write currents to the write element 144 by the preamp 132.

The read element 146 preferably comprises a magneto-resistive (MR) element that undergoes a change in electrical characteristics when subjected to a magnetic field of a selected orientation. During a read operation, the preamp 132 biases the read element 146 and generates a readback signal in relation to changes in voltage across the read element 146 as the element passes over the selective magnetization of a track. It will be understood that references herein to an "MR head" or "MR element" cover a wide variety of head constructions including, but not limited to, anisotropic magneto-resistive (AMR) and giant magneto-resistive (GMR) heads.

Figure 5:
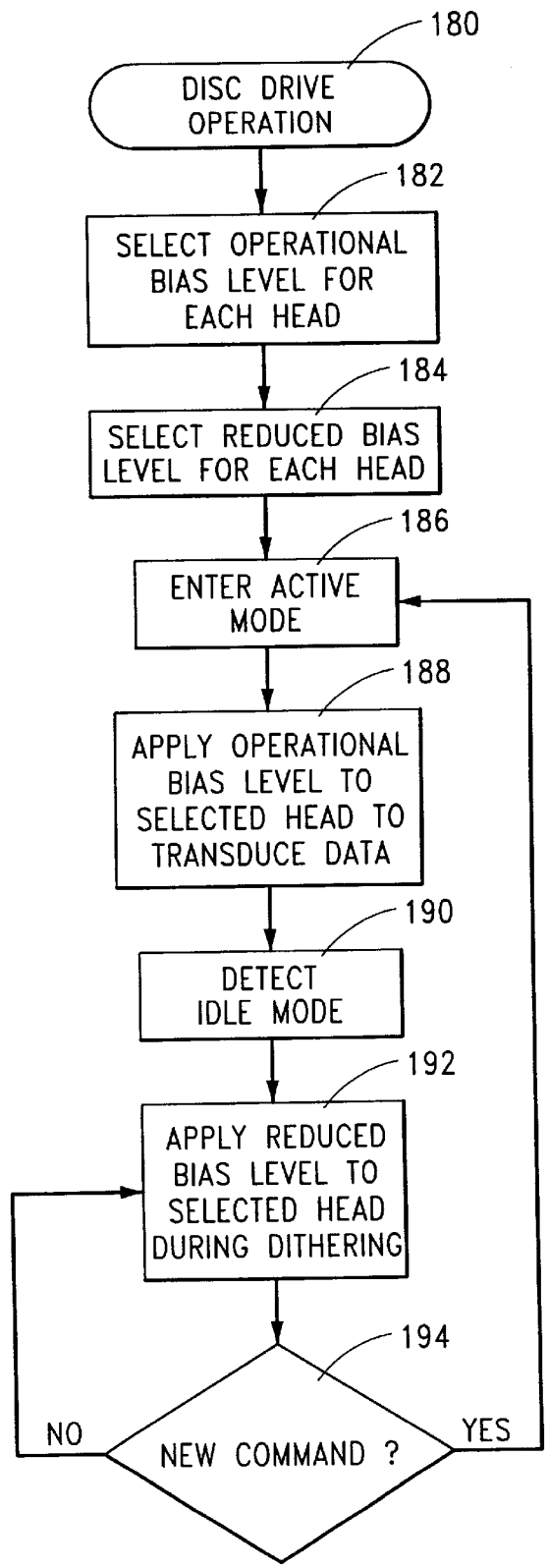
FIG. 5 is a functional block diagram of a preamplifier driver circuit of the disc drive of FIG. 1 constructed and operated in accordance with preferred embodiments of the present invention.

FIG. 5 provides a functional block diagram for the preamp 132 in conjunction with four heads 112 (respectively identified as HEAD 1–HEAD 4). The preamp 132 includes a control circuit 148 with buffer 150, a head select circuit 152, a read bias current source 154, a multiplexor (mux) circuit 156, a write driver 158 and a read preamplifier driver 160. A set of write conductors 162 and a set of read conductors 164 respectively connect the write element 144 and the read element 146 of each head 112 to the preamp 132. As shown in FIG. 1, these conductors are incorporated into flex-on-suspension (FOS) strips which are routed to each head 112.

The control circuit 148 provides top level control of the operation of the preamp 132 and receives read gate (RG) and write gate (WG) signals from the sequencer on paths 166 and 168. The buffer 150 is connected via a serial interface path 170 with the DSP 138, which writes multi-bit control words to the buffer to identify which head 112 is to be selected and to identify the nominal baseline value of read bias current for the selected head.

When a new control word is written to the buffer, the read bias current source 154 outputs the appropriate bias current magnitude to the mux 156 on path 172. The head select circuit 152 proceeds to provide selection inputs to the mux 156 on path 174 to enable the appropriate write and read conductors 162, 164 for the selected head 118. For example, if the control word indicates that HEAD 1 is to be selected, the head select circuit 152, read bias current source 154 and the mux 156 will cooperate to generate and transmit the read bias current along path 172, through the mux 156, and along the read conductors 164 to the read element 146 of HEAD 1.

To read data (user data or servo data), the read preamplifier driver 160 monitors the voltage across the read element 146 of the selected head 112 and outputs an amplified readback signal (DATA OUT) on path 176 to the R/W channel 130 (FIG. 3). To write data, the write driver 158 receives an encoded, serialized data stream (DATA IN) on path 178 from the R/W channel 130, and generates and applies the appropriate write currents $I_W$ to the mux 156. The mux 156 in turn transmits the write currents along the appropriate write conductors 162 to the selected head 112 to write the data to the corresponding disc surface.

It will be noted that while the preamp 132 is configured to apply read bias currents to the MR elements 146, the preamp 132 could readily be alternatively configured to apply read bias voltages across the MR elements 146. Hence, reference herein to "read bias signals" and "read bias levels" will be understood to cover the application of either current or voltage of selected magnitude to the MR elements in order to prepare the MR elements to transduce data.

FIG. 6 provides a flow chart for a DISC DRIVE OPERATION routine 180, illustrative of steps carried out by the disc drive 100 during operation in accordance with preferred embodiments of the present invention.

The routine commences at step 182 with the selection of appropriate operational bias levels for each of the heads 112 to enable the heads 112 to transduce data from the discs 108 during normal operation. While the same magnitude of bias signal (current) could be applied to each of the heads 112 during operation, improved performance is typically obtained by individually tailoring the bias signal for each head to account for nominal variations in the constructions of the elements.

A variety of methodologies are known in the art to select an optimal read bias current magnitude for an MR element. A preferred approach involves, for each head in turn, writing test data to a selected track and then repetitively reading back the data while calculating channel quality measurements in the read/write channel 130. The optimum read bias signal is selected as that signal that provides the best readback performance. The use of channel quality measurements to parametrically configure a disc drive is discussed in U.S. Pat. No. 6,252,731 issued to Sloan, et al. The operational read bias signals selected during step 182 are stored for subsequent access by the servo DSP 138.

The routine continues to step 184 wherein correspondingly reduced bias levels are selected for each of the heads 112. As discussed below, the reduced bias levels are used during idle conditions of the disc drive (periods of inactivity) when no host commands are processed by the drive, but the discs remain spinning. This is to be distinguished from a deactivated state wherein the disc drive is inactive and the discs are brought to rest (such as after a long period of inactivity or when the host device is powered down).

During such idle conditions, the drive enters a dithering mode of operation in which the heads are sequentially selected and moved to different tracks on the discs. Such dithering operations provide a number of advantages including maintaining the drive in an operationally ready mode to resume operation once a new command is received from the host, as well as to clear contaminants from the surfaces of the discs. Suitable dithering sequences are discussed in U.S. Pat. No. 5,859,738 issued to Forehand et al.

In order to carry out seeks during dithering, it is generally necessary to transduce the servo data from the associated disc in order to detect position and velocity of the head 112. The associated MR element 146 should thus continue to be biased during dithering in order to transduce the servo data from the associated disc. However, the frequency and configuration of the servo data are typically such that a substantially lower bias level will enable reliable decoding of the servo data, even though such a lower bias level will not provide sufficient signal-to-noise margin to read the user data at an acceptable error rate level. The reduced bias levels are preferably selected to provide acceptably reliable detection of the servo data while at the same time reducing heat dissipation and stress to the MR elements 146 to reduce electromigration.

The reduced bias levels can be selected in a number of ways. One preferred approach is to simply apply a derating factor to the operational bias levels across the board to arrive at the reduced bias levels. For example, the reduced bias levels can be selected as a predetermined percentage (such as 70%) of the operational bias levels obtained in step 182.

Another preferred approach is to individually tailor the reduced bias levels on a per-head basis to identify the smallest bias level that allows sufficiently reliable detection of the servo data on the discs 108. This can be carried out by, for each head in turn, initially applying the operational bias level to the head and then successively reducing the level in increments while carrying out a number of random seeks to different tracks on the associated disc 108 until the minimum bias level is identified that still provides acceptable detection of the servo data.

Once suitable reduced bias levels have been identified during step 184, the values are also stored for subsequent access. Both steps 182 and 184 are preferably carried out during disc drive manufacturing, although these steps can also be periodically carried out at appropriate times during field use.

Continuing with FIG. 6, the routine passes to step 186 wherein the disc drive 100 enters an active mode of operation. During the active mode, the disc drive 100 is fully operational and receives host commands to transfer data between the discs 108 and the host device. As each head 112 is selected in turn, the appropriate operational bias level from step 182 is applied to the head 112 and used to transduce data from the disc 108, as shown by step 188. It will be noted that during a read operation the MR element 146 operates to transduce both user data from the user data areas 122 (FIG. 2) and servo data from the servo data fields 120 on the selected track 118. During a write operation, the MR element 146 transduces the servo data from the servo data fields 120 while the write element 144 writes the input user data to the appropriate user data sectors on the track.

Step 190 indicates the detection of an idle condition by the disc drive 100, which preferably occurs once a predetermined period of time elapses during which no host commands are received or pending in a command queue (not shown) in the I/F circuit 126 (FIG. 3). The predetermined period of time can be any suitable value, such as 500 milliseconds. Once the disc drive 100 enters the idle mode, the flow passes to step 192 and the reduced bias level from step 184 for the selected head 112 is applied and used to transduce servo data from the disc 108 during dithering operations. If the idle condition continues long enough so that it becomes desirable to switch to different heads, the appropriate reduced bias level is applied to each newly selected head and the dithering operation continues. Decision step 194 inquires whether a new command has been received from the host. If so, the disc drive 100 returns to active mode (step 186); otherwise, the dithering operation continues.

Returning briefly to FIG. 5, it will be noted that the switching between the operational bias level and the reduced bias level for a selected head 112 can be carried out in a number of ways. One preferred approach simply involves having the DSP 138 write a new multi-bit value to the buffer 150 to indicate the reduced bias level (current) to be applied to the selected head. Another preferred approach is to configure the read bias current source 154 to adjust the bias current magnitude in response to an idle command signal (on path 196) issued by the sequencer. In this latter case, the read bias current source 154 can either apply a fixed derating to the existing current setting, or adjust the current based on a digital input value transmitted to the current source 154 (using a signal path not shown in FIG. 5).

It will now be understood that the present invention (as embodied herein and as claimed below) is generally directed to an apparatus and method for enhancing disc drive reliability through the application of reduced read bias levels during disc drive idle modes of operation. In accordance with preferred embodiments, a disc drive (such as 100) is provided with a head (such as 112) having a read element (such as 146) used to transduce data from a recording surface (such as 108).

The disc drive is initially operated in an active mode of operation (such as by step 186) in which data are transferred between the recording surface and a host device in response to a number of host data transfer commands. An operational read bias signal of selected, nonzero magnitude is applied to the read element to transduce data from the recording surface during the active mode (such as by step 188).

Once a predetermined, uninterrupted period of time elapses since the most recent host data transfer command, the disc drive switches to an idle mode of operation (such as by step 190). The read bias signal is reduced to a second, nonzero magnitude less than the magnitude of the operational read bias signal and used to transduce data from the data recording surface during the idle mode (such as by step 192).

Preferably, the disc drive performs a dithering operation during the idle mode so that the disc drive carries out a number of seeks to tracks on the recording surface, and wherein the data transduced by the reduced read bias signal comprises servo data (such as 122) indicative of position of the read element during said seeks.

The operational read bias signal magnitude is preferably selected using specified criteria, such as read error rate or channel quality measurements. The reduced read bias signal magnitude is preferably selected as a predetermined percentage of the operational read bias signal, or by reducing the read bias level while transducing servo data from the recording surface.

For purposes of the appended claims, the function of the recited "first means" is carried out by the preamplifier driver circuit 132 which outputs read bias currents in response to input signals provided by the DSP 130 and the I/F circuit 126. Since the read element is used to transduce data during the idle mode, prior art circuits that remove the biasing from a read element during idle periods so that no current flows through the read element are excluded from the scope of the claim and the definition of an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the method for reducing bias levels in a disc drive read element without departing from the spirit and scope of the claimed invention.

In addition, although the embodiments described herein are directed to a method and apparatus for reducing bias levels in a disc drive read element, it will be appreciated by those skilled in the art that the method can be used for other types of data storage devices without departing from the spirit and scope of the claimed invention.

What is claimed is:

1. A method for operating a disc drive having a read element which transduces data from a recording surface, comprising steps of:
    (a) operating the disc drive in an active mode of operation in which data are transferred between the recording surface and a host device in response to a number of host data transfer commands;
    (b) applying an operational read bias signal of selected, nonzero magnitude to the read element to transduce data from the recording surface during the active mode of step (a);
    (c) switching to an idle mode of operation after passage of a predetermined, uninterrupted period of time since the most recent host data transfer command; and
    (d) applying a reduced read bias signal of selected, nonzero magnitude less than the magnitude of the operational read bias signal to the read element to transduce data from the recording surface during the idle mode of step (c).

2. The method of claim 1, further comprising a step of (e) switching back to the active mode of operation upon receipt of a new host data transfer command and repeating steps (a) through (d).

3. The method of claim 1, wherein the disc drive performs a dithering operation during the idle mode so that the disc drive carries out a number of seeks to tracks on the recording surface, and wherein the data transduced by the reduced read bias signal of step (d) comprises servo data indicative of position of the read element during said seeks.

4. The method of claim 1, further comprising a prior step of selecting the magnitude of the operational read bias signal based on specified criteria.

5. The method of claim 4, further comprising another prior step of selecting the magnitude of the reduced read bias signal as a selected percentage of the magnitude of the operational read bias signal.

6. The method of claim 4, further comprising another prior step of selecting the magnitude of the reduced read bias signal based on specified criteria.

7. The method of claim 1, wherein the read element comprises a magneto-resistive (MR) read element.

8. A disc drive configured for communication with a host device, the disc drive comprising:
- a recording surface;
- a read/write head adjacent the recording surface and comprising separate write and read elements;
- a communication channel which processes host data transfer commands to direct the transfer of data between the recording surface and a host device; and
- a preamplifier driver circuit coupled to the read/write head and to the communication channel which applies an operational read bias signal of selected, nonzero magnitude to the read element to transduce data from the recording surface during an active mode of operation during which host data transfer commands are processed, and which applies a reduced read bias signal of selected, nonzero magnitude less than the magnitude of the operational read bias signal to the read element to transduce data from the recording surface during an idle mode of operation initiated after passage of a predetermined, uninterrupted period of time since the most recent host data transfer command.

9. The disc drive of claim 8, wherein the preamplifier subsequently applies the operational read bias signal to the read element upon receipt of a new host data transfer command.

10. The disc drive of claim 8, further comprising a servo circuit which controllably positions the head in response to servo data stored on the recording surface, wherein the servo circuit performs a dithering operation during the idle mode by carrying out a number of seeks to move the head to different tracks on the recording surface, and wherein the data transduced by the reduced read bias signal comprises servo data indicative of position of the head during said seeks.

11. The disc drive of claim 8, wherein the magnitude of the operational read bias signal is selected based on specified criteria.

12. The disc drive of claim 11, wherein the magnitude of the reduced read bias signal is selected as a selected percentage of the magnitude of the operational read bias signal.

13. The disc drive of claim 11, wherein the magnitude of the reduced read bias signal is selected based on specified criteria.

14. The disc drive of claim 8, wherein the read element comprises a magneto-resistive (MR) read element.

15. A disc drive configured for communication with a host device, the disc drive comprising:
- a recording surface;
- a read/write head adjacent the recording surface and comprising separate write and read elements;
- a communication channel which processes host data transfer commands to direct the transfer of data between the recording surface and a host device; and
- first means for reducing electromigration in the read element.

16. The disc drive of claim 15, wherein the first means comprises a preamplifier driver circuit coupled to the read/write head and to the communication channel.

17. The disc drive of claim 15, further comprising a servo circuit which controllably positions the head in response to servo data stored on the recording surface, wherein the servo circuit performs a dithering operation during the idle mode by carrying out a number of seeks to move the head to different tracks on the recording surface, and wherein the data transduced by the reduced read bias signal comprises servo data indicative of position of the head during said seeks.

18. The disc drive of claim 15, wherein the read element comprises a magneto-resistive (MR) read element.

* * * * *